United States Patent
Eatedali et al.

(10) Patent No.: US 10,791,372 B2
(45) Date of Patent: Sep. 29, 2020

(54) SYSTEMS AND METHODS FOR EXTENDING ACCESS TO SUBSCRIPTION-BASED MEDIA CONTENTS

(71) Applicant: Disney Enterprises, Inc., Burbank, CA (US)

(72) Inventors: Josiah Eatedali, Los Angeles, CA (US); Edward C. Drake, Stevenson Ranch, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 30 days.

(21) Appl. No.: 15/284,351

(22) Filed: Oct. 3, 2016

(65) Prior Publication Data
US 2018/0098126 A1    Apr. 5, 2018

(51) Int. Cl.
| | |
|---|---|
| *H04N 21/472* | (2011.01) |
| *H04N 21/278* | (2011.01) |
| *H04N 21/845* | (2011.01) |
| *H04N 21/488* | (2011.01) |
| *H04N 21/475* | (2011.01) |
| *G06F 21/10* | (2013.01) |
| *G06F 16/955* | (2019.01) |
| *H04N 21/478* | (2011.01) |
| *H04N 21/6334* | (2011.01) |

(52) U.S. Cl.
CPC ..... *H04N 21/47202* (2013.01); *G06F 16/955* (2019.01); *G06F 21/10* (2013.01); *H04N 21/278* (2013.01); *H04N 21/4758* (2013.01); *H04N 21/47815* (2013.01); *H04N 21/4882* (2013.01); *H04N 21/6334* (2013.01); *H04N 21/8456* (2013.01); *G06F 2221/0713* (2013.01)

(58) Field of Classification Search
None
See application file for complete search history.

(56) References Cited

U.S. PATENT DOCUMENTS

| | | | |
|---|---|---|---|
| 6,802,077 | B1 | 10/2004 | Schlarb |
| 6,973,621 | B2 | 12/2005 | Sie |
| 7,634,076 | B2 | 12/2009 | Lee |

(Continued)

OTHER PUBLICATIONS

Author Unknown. *Paramount Home Media Distribution and Warner Bros. Home Entertainment Detail Home Media Distribution Deal*, Close-Up Mode, Inc., Oct. 2012. pp. 1-3.

(Continued)

*Primary Examiner* — Nathan J Flynn
*Assistant Examiner* — Christen A Kurien
(74) *Attorney, Agent, or Firm* — Farjami & Farjami LLP

(57) ABSTRACT

There is provided a system including a non-transitory memory storing a subscription entitlement database and a hardware processor configured to provide access to a media content to a user during an availability window for the media content, according to a subscription right associated with the media content in the subscription entitlement database, notify a user of the availability window for the media content, present the user with an option to extend access to the media content beyond the availability window for the media content, in response to a selection of the option to extend access from the user, extend access to the media content after the availability window.

18 Claims, 3 Drawing Sheets

(56) References Cited

U.S. PATENT DOCUMENTS

| | | | |
|---|---|---|---|
| 7,908,626 B2 * | 3/2011 | Williamson | G06F 3/0482 |
| | | | 725/90 |
| 8,006,273 B2 | 8/2011 | Rodriguez | |
| 8,037,506 B2 | 10/2011 | Cooper | |
| 8,341,242 B2 | 12/2012 | Dillon | |
| 2003/0040962 A1 | 2/2003 | Lewis | |
| 2009/0019489 A1 * | 1/2009 | Ohlfs | H04N 7/163 |
| | | | 725/44 |
| 2012/0131603 A1 * | 5/2012 | Williamson | G06F 3/0482 |
| | | | 725/25 |
| 2013/0060660 A1 | 3/2013 | Maskatia | |
| 2014/0006951 A1 | 1/2014 | Hunter | |
| 2014/0089033 A1 | 3/2014 | Snodgrass | |
| 2014/0114919 A1 * | 4/2014 | Woods | H04N 21/23109 |
| | | | 707/634 |
| 2014/0330938 A1 | 11/2014 | Setos | |
| 2014/0331252 A1 * | 11/2014 | Jin | H04N 21/2541 |
| | | | 725/29 |
| 2016/0057471 A1 * | 2/2016 | Eatedali | H04N 21/25435 |
| | | | 725/28 |

OTHER PUBLICATIONS

Author Unknown. *Akimbo Introduces Download-to-Own Platform for Video; Download-to-Own Model Lets Akimbo Subscribers Purchase Videos to Create a Digital Archive*, Business Wire, Sep. 2005. pp. 1-3.

Author Unknown. *CinemaNow is First to Add Download-To-Own Video Option to Online Service*, Business Wire, Jan. 2004. pp. 1-4.

* cited by examiner

SYSTEMS AND METHODS FOR EXTENDING ACCESS TO SUBSCRIPTION-BASED MEDIA CONTENTS

BACKGROUND

Rather than purchasing physical media, consumers increasingly access media contents online from content providers, such as a cable provider or content streaming provider. Content providers include subscription-based content providers and transactional content providers. Conventionally, subscription-based content providers allow a user to access a predetermined library of subscription content during a limited availability window, and transactional content providers allow a user to access individual media contents, which the user has purchased.

SUMMARY

The present disclosure is directed to systems and methods for extending access to subscription-based media contents, substantially as shown in and/or described in connection with at least one of the figures, as set forth more completely in the claims.

DETAILED DESCRIPTION

Figure 1:
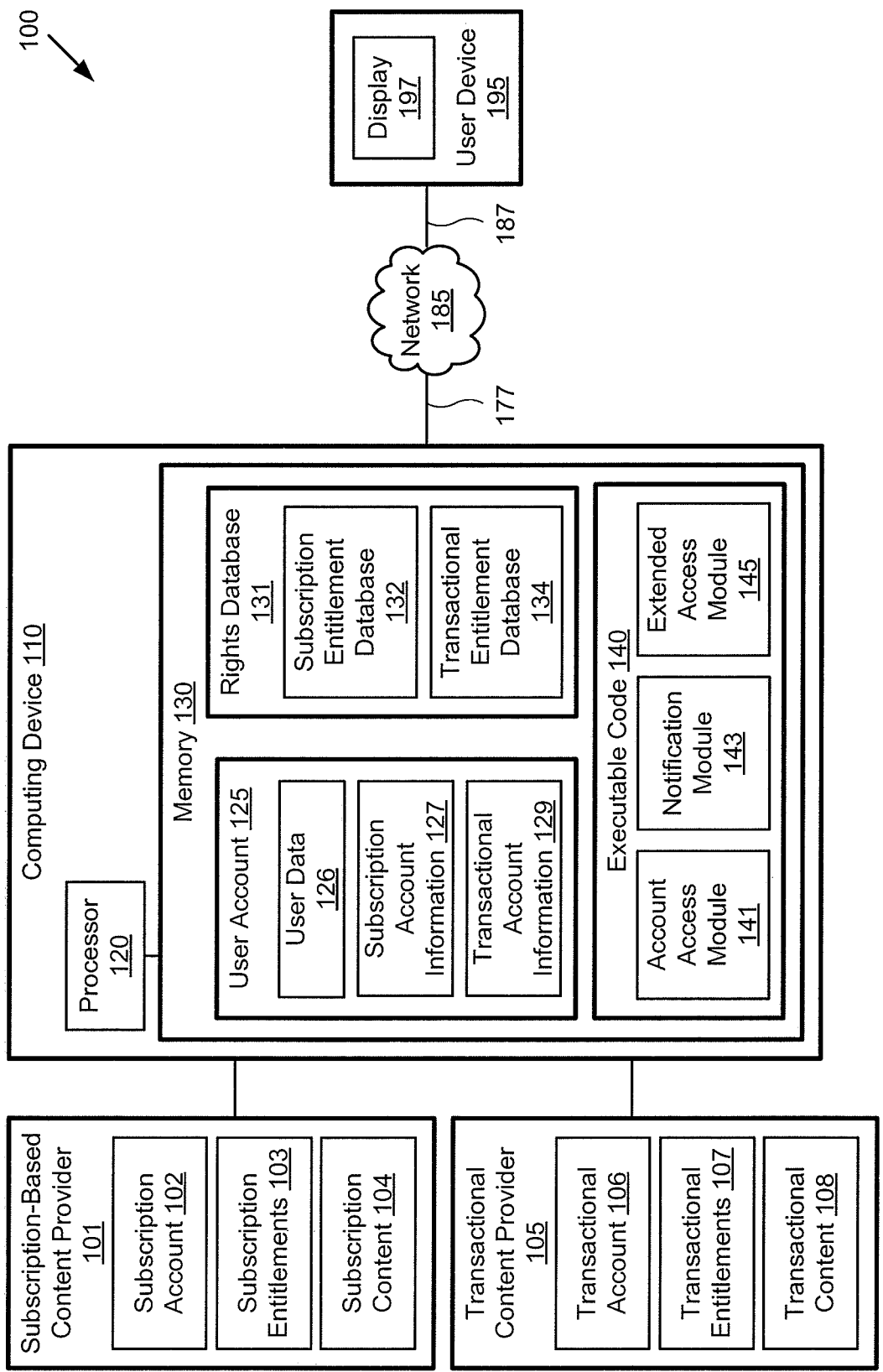
FIG. 1 shows a diagram of an exemplary system for extending access to subscription-based media contents, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for extending access to subscription-based media contents, according to one implementation of the present disclosure. Diagram 100 includes subscription-based content provider 101, transactional content provider 105, network 185, and computing device 110. As shown in FIG. 1, subscription-based content provider 101 is connected to network 185 via connection 113, transactional content provider 105 is connected to network 185 via connection 115, and computing device 110 is connected to network 185 via connection 117. Network 185 may be a computer network, such as the Internet. Subscription-based content provider 101 includes subscription account 102, subscription entitlements 103, and subscription content 104. In some implementations, subscription-based content provider 101 may be a cable content provider, an online content provider, such as a subscription streaming service, e.g., Netflix, Amazon Video, Hulu, etc., or other content provider that provides access to subscription content 104. In one implementation, subscription-based content provider 101 may be an on-demand content provider, such as a subscription video on demand (SVOD) content provider. In other implementations, subscription-based content provider 101 may provide media contents such as computer games, music, audio books, electronic books, etc.

Subscription account 102 may include a user's subscription account login information, personal information about a user, such as first and last name of the user, a username to sign in to subscription account 102, contact information of the user, payment information for subscription account 102, a start date of the subscription, a term of the subscription and/or an expiration date of the subscription, etc. In some implementations, subscription account 102 may include one or more account profiles associated with a corresponding one or more users of subscription account 102, such as a profile for each parent in a household and a profile for each of one or more children in the household. Various profiles associated with subscription account 102 may have different permissions and/or restrictions associated therewith. For example, a profile associated with a child may have viewing restrictions, such as content rating restrictions, time-of-day viewing restrictions, etc.

Subscription entitlements 103 may include permissions allowing a user to access subscription content 104. In one implementation, subscription entitlements 103 may include a database of media contents for which access is allowed, such as a database including a plurality of media contents that are currently available through subscription-based content provider 101. Subscription entitlements 103 may include an availability window for each media content in the database. For example, subscription entitlements 103 may include an availability window start date on which user access to subscription content 104 may begin, a duration of the availability window for each media content in the database, and/or an availability window end date past which access to subscription content 104 may not be allowed. Subscription content 104 may include a plurality of media contents, such as movies, television shows, music, audio books, electronic books, computer games, etc.

Transactional content provider 105 includes transactional account 106, transactional entitlements 107, and transactional content 108. In one implementation, transactional content provider 105 may be an on-demand content provider, such as a transactional video on-demand (TVOD) content provider. In other implementations, transactional content provider 105 may provide media contents such as computer games, music, audio books, electronic books, etc. Transactional content provider 105 may be a cable content provider, e.g., HBO, an online content provider, such as a transactional streaming service that allows a user to rent or purchase a media content, e.g., iTunes, Amazon Video, etc., or other content provider that provides access to transactional content 108.

Transactional account 106 may include a user's transactional account login information, personal information about the user, such as first and last name of the user, a username to sign in to transactional account 106, contact information of the user, payment information for transactional account 106, etc. In some implementations, transactional account 106 may include one or more account profiles associated with a corresponding one or more users of transactional account 106, such as a profile for each parent in a household and a profile for each of one or more children in the household. Various profiles associated with transactional account 106 may have different permissions and/or restrictions associated therewith. For example, a profile associated with a child may have viewing restrictions, such as content rating restrictions, time-of-day viewing restrictions, etc.

Transactional entitlements 107 may include permissions allowing a user to access transactional content 108. In one implementation, transactional entitlements 107 may include a database of media contents for which access is allowed, such as a database including a plurality of media contents that a user has rented or purchased. Transactional content 108 may include media contents, such as movies, television shows, music, audio books, electronic books, computer games, etc.

Computing device 110 may be a server for providing access to subscription-based media content through a transactional media provider. Computing device 110 includes processor 120 and memory 130. Processor 120 is a hardware processor, such as a central processing unit (CPU), found in computing devices. Memory 130 is a non-transitory storage device for storing computer code for execution by processor 120, and also for storing various data and parameters. As shown in FIG. 1, memory 130 includes user account 125, rights database 131 and executable code 140. User account 125 may be an account associated with user login identification, such as a username, a password, etc. In one implementation, user account 125 may include user data 126. User data 126 may include information about a user, such as age, gender, location, e.g., home address, preferences, e.g., favorite movies, favorite television shows, favorite music, preferred genres, etc. In one implementation, user account 125 may store account information for various accounts associated with the user, such as subscription account information 127, transactional account information 129, etc., allowing a user to login to user account 125 and access media contents, such as subscription content 104 and/or transactional content 108, without the user having to separately log in to an account with subscription-based content provider 101 and/or an account with transactional content provider 105.

Rights database 131 may be a database for storing rights to media contents, such as rights to subscription content 104 and/or rights to transactional content 108. Rights database 131 includes subscription entitlement database 132 and transactional entitlement database 134. In some implementations, subscription entitlement database 132 may store rights to one or more media contents, such as subscription content 104 via subscription-based content provider 101. Transactional entitlement database 134 may store rights to one or more media contents, such as transactional content 108 via transactional content provider 105.

Executable code 140 may contain one or more executable modules for execution by processor 120. As shown in FIG. 1, executable code 140 includes account access module 141, notification module 143, and extended access module 145. Account access module 141 is a software module stored in memory 130 for execution by processor 120 to access subscription account 102 and transactional account 106. In some implementations, when the user signs in to user account 125, account access module 141 may use subscription account information 127 to sign in to subscription account 102 and/or account access module 141 may use transactional account information 129 to sign in to transactional account 106. In one implementation, a user using user device 195 may access subscription content 104 and/or transactional content 108 via user account 125.

User device 195 may be a smart television, a computer, a tablet computer, a mobile device, or other device suitable for watching media contents. In one implementation, a user may log in to user account 125 using user device 195. Once logged in to user account 125, the user may access subscription content 104 and/or transactional content 108 via executable code 140. As shown in FIG. 1, computing device 110 is connected to network 185 via connection 177, and user device 195 is connected to network 185 via connection 187. Network 185 may be a computer network, such as the Internet.

Figure 2:
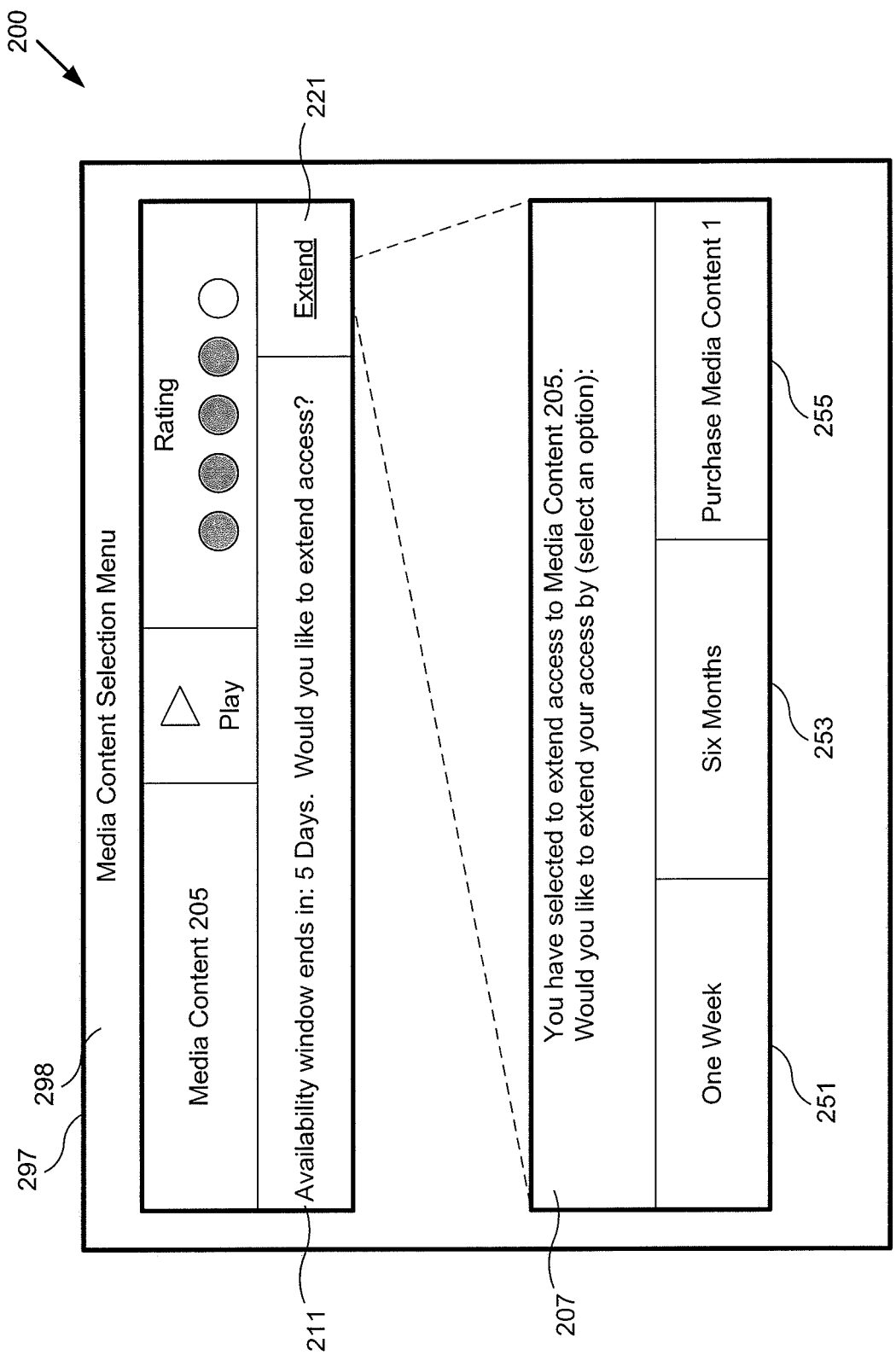
FIG. 2 shows a diagram of an exemplary user interface for extending access to subscription-based media contents, according to one implementation of the present disclosure.

FIG. 2 shows a diagram of an exemplary user interface for extending access to subscription-based media contents, according to one implementation of the present disclosure. Diagram 200 shows media content selection menu 298 displayed on display 297. In one implementation, media content selection menu 298 may display one or more media contents that a user may select to play, such as media content 205. Media content selection menu 298 may include various user controls, such as controls to play media content 205, save media content 205 to a list, such as a favorites list or a preferred content list. Media content selection menu 298 may include information about media content 205, such as a user rating, an average community rating, a description, etc.

In one implementation, media content selection menu 298 may include notification 211. Notification module 143 may display a notification using notification 211. For example, notification module 143 may notify a user of an availability window of media content 205. The notification may include a start date of the availability window, an end date of the availability window, a length of the availability window, etc. In some implementations, when the end of the availability window for media content 205 is approaching, the user may be presented with an option to extend access to media content 205, such as my selecting button 221. When a user selects button 221 to extend access to media content 205, notification module 143 may display message 207 presenting one or more options that the user may select to extend access. In some implementations, the user may select from options such as option 251, option 254, and option 255. In one implementation, option 251 may extend access to media content 205 using a short-term temporary extension, such as one week, option 253 may extend access to media content 205 using a long-term temporary extension, such as six months, and option 255 may extend access to media content 205 using an unlimited extension, such as by allowing the user to purchase media content 205.

In some implementations, a user may purchase extended access to media content 205 by purchasing an extended term, such as a short-term extended access, a long-term extended access, or an unlimited extended access. In one implementation, a user may purchase extended access by paying an extended access fee. In another implementation, the user may purchase extended access by selecting an ad-supported option, allowing the content producer and/or the content provider to present advertisements to the user in exchange for the extended access to media content 205.

Figure 3:
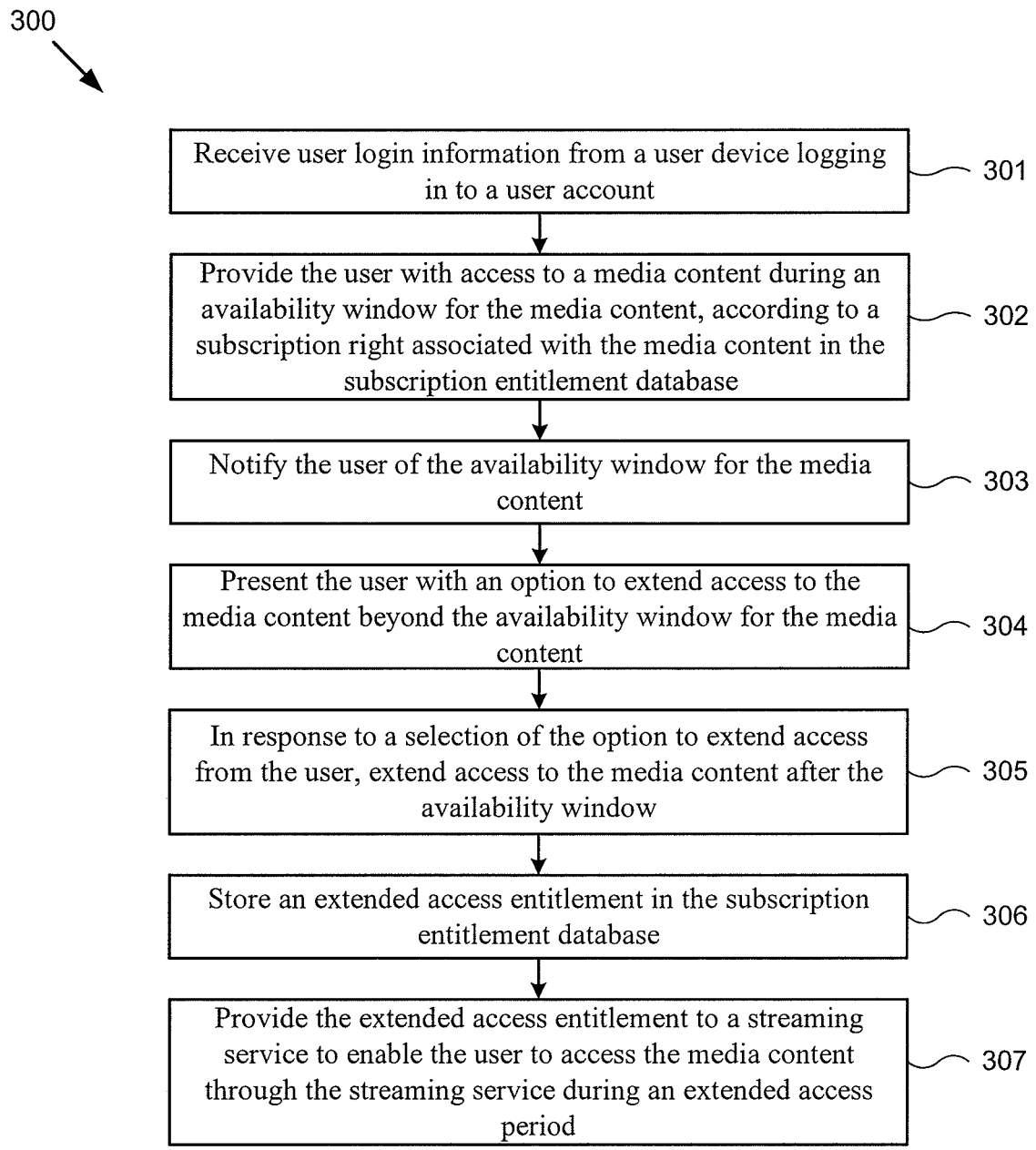
FIG. 3 shows a flowchart illustrating an exemplary method of extending access to subscription-based media contents, according to one implementation of the present disclosure.

FIG. 3 shows a flowchart illustrating an exemplary method of extending access to subscription-based media contents, according to one implementation of the present disclosure. Method 300 begins at 301, where executable code 140 receives user login information from user device 195 logging in to user account 125. User account 125 may include account information for accessing one or more content provider accounts. In some implementations, account access module 141 may use subscription account information 127 to automatically log in to subscription account 102 when the user logs in to user account 125.

At 302, executable code 140 provides the user with access to subscription content 104 during an availability window for subscription content 104, according to a subscription right associated with subscription content 104 in subscription entitlement database 132. In some implementations, account access module 141 may display a menu of available media contents from which a user may select. For example, account access module 141 may transmit a media content menu for display on display 197 and may include a list of titles from which the user may select. In one implementation, each available media content may be displayed as an icon or a tile that the user may select. The media content menu may include subscription content 104. The availability window may be a period of time, such as a number of days, a number of weeks, a number of months, etc., during which the user may access subscription content 104. The availability window for subscription content 104 may have a start date and an end date, and/or an availability window length. In some implementations, account access module 141 may access subscription content 104 and provide subscription content 104 to user device 195 for display on display 197. For example, account access module 141 may allow the user to view video content on user device 195, listen to audio content on user device 195, read electronic book content on user device 195, play game content on user device 195, etc.

At 303, executable code 140 notifies the user of the availability window for subscription content 104. For example, notification module 143 may display a pop-up message notifying the user of the availability window for subscription content 104 when the user logs in to user account 125, such as by displaying a flag next to the icon representing subscription content 104. For example, display 197 may show a plurality of icons each representing an available media content, and the icon representing subscription content 104 may have a flag or label indicating a number of days remaining for the availability window of subscription content 104. In another implementation, notification module 143 may send a notification of the availability window of subscription content 104 to the user by email, such as an email to the user's personal email account or as an electronic message delivered to user account 125. In some implementations, the notification may include information about the availability window for subscription content 104, such as the start date of the availability window, the length of the availability window, and/or an end date of the availability window. In another implementation, notification of the availability window may be included in media content selection menu 298.

At 304, executable code 140 presents the user with an option to extend access to subscription content 104 beyond the availability window for the media content. In some implementations, extended access module 145 may include the option to extend access to subscription content 104 in the availability window notification, such as by including the option to extend access in the pop-up notification, in the email notification, in media content selection menu 298, etc. The option to extend access to subscription content 104 may include one or more extension options. For example, extended access module 145 may present the user with an option to temporarily extend access to subscription content 104. This may be useful in a situation where the user has watched nearly all of the episodes of a multi-season television show and only has a few episodes left to finish the series, but the availability window for the television show is ending. In such as situation, the user may choose to extend access to the television show for a short-term temporary extension, such as one day, one week, etc.

Another example of a temporary extension may be a longer-term temporary extension. For example, the user may select an option to extend access to subscription content 104 for one month, six months, one year, etc. The option to extend access to subscription content 104 may include a permanent extension. For example, extended access module 145 may present the user with an option to purchase subscription content 104. If the user selects an option to permanently extend access to subscription content 104, the user may gain unlimited access to subscription content 104 through subscription-based content provider 101, or the user may be given the option to download subscription content 104 to user device 195.

In some implementations, the user may be presented the option to extend access to media contents that the user has viewed. In other implementations, the user may be presented the option to extend access to media contents based on information stored in user data 126, such as user preferences, and/or a user's viewing activity. For example, the user may be presented an option to extend access to subscription content 104, even though the user has not viewed subscription content 104, when subscription content 104 is a genre of media content that the user prefers. Such a preference may be indicated in user data 126 and/or may be inferred from the user's viewing activity. In other implementations, the user may be presented the opportunity to extend access to subscription content 104 based on a user rating of subscription content 104. For example, a user who has rated subscription content 104 highly, or above a threshold, may be presented the option to extend access to subscription content 104.

At 305, in response to a selection of the option to extend access from the user, executable code 140 extends access to the media content after the availability window. In some implementations, extending access to subscription content 104 may include enabling the user to stream subscription content 104 from a content provider, such as subscription-based content provider 101, beyond the end of the availability window. In other implementations, extending access to subscription content 104 may include enabling the user to download subscription content 104 to user device 195.

At 306, executable code 140 stores an extended access entitlement in subscription entitlement database 132. In some implementations, the extended access entitlement may correspond to the extended access selected by the user. For example, if the user selected a short-term temporary extended access, the extended access entitlement stored in subscription entitlement database 132 may be a short-term extended access entitlement. If the user selected a longer-term temporary extended access, the extended access entitlement stored in subscription entitlement database 132 may be a longer-term extended access entitlement. If the user selected a permanent extended access, the extended access entitlement stored in subscription entitlement database 132 may be a permanent extended access entitlement. In some implementations, the extended access entitlement may allow the user to access subscription content 104 outside the availability window of subscription content 104.

At 307, executable code 140 provides the extended access entitlement to a streaming service to enable the user to access the media content through the streaming service during an extended access period. In some implementations, a user may sign in to transactional account 106 with transactional content provider 105, either directly or through user account 125, to access transactional content 108. In response to the user requesting playback of transactional content 108, transactional content provider 105 may search transactional entitlements 107 for an entitlement corresponding to transactional content 108. If transactional content provider 105 does not find an entitlement corresponding to transactional content 108, transactional content provider 105 may transmit a request to extended access module 145 requesting an entitlement corresponding to transactional content 108. Extended access module 145 may search rights database 131 and may identify the extended access entitlement stored in subscription entitlement database 132. When the extended entitlement stored in subscription entitlement database 132 corresponds to transactional content 108, extended access module 145 may provide the extended access entitlement to transactional content provider 105 to enable access to transactional content 108.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing a subscription entitlement database; and
a hardware processor configured to:
  display a user interface for a user to access a media content during a subscription on-demand availability window for the media content, according to a subscription on-demand right associated with the media content in the subscription entitlement database;
  prior to an end date of the subscription on-demand availability window, display a notification on the user interface to notify the user of the subscription on-demand availability window for the media content, prior to the user performing any of selecting to access the media content or accessing the media content, based on the subscription on-demand right to indicate the end date of the subscription on-demand availability window;
  display an on-demand right extension option on the user interface for the user to extend access to the media content available based on the subscription on-demand right beyond the end date of the subscription on-demand availability window for the media content based on the subscription on-demand right;
  in response to receiving, via the user interface, a selection of the on-demand right extension option to extend access from the user, extend access to the media content beyond the end date of the subscription on-demand availability window for the media content based on the subscription on-demand right;
  receive, via the user interface, a request from the user to stream the media content after the end date of the subscription on-demand availability window for the media content based on the subscription on-demand right; and
  stream the media content to the user, in response to the request, after the end date of the subscription on-demand availability window if the user extended access to the media content.

2. The system of claim 1, wherein the extended access is one of a limited-term extended access entitlement and a permanent extended access.

3. The system of claim 2, wherein, when the extended access is the permanent extended access, the hardware processor is further configured to:
store an extended access entitlement in a transactional entitlement database.

4. The system of claim 1, wherein providing access to the media content for the duration of the extended access includes enabling the user to download the media content to a user device.

5. The system of claim 1, wherein extending access to the media content for the duration of the extended access includes enabling the user to stream the media content for the duration of the extended access.

6. The system of claim 1, wherein the hardware processor is further configured to:
store an extended access entitlement in the subscription entitlement database;
provide the extended access entitlement to a streaming service to enable the user to access the media content through the streaming service during an extended access period.

7. The system of claim 1, wherein the user is notified of the subscription on-demand availability window based on one of a genre of the media content, and a user rating of the media content.

8. The system of claim 1, wherein the media content is one of a video content, an audio content, a computer game, and an app.

9. The system of claim 1, wherein extending access to the media content includes adjusting the subscription on-demand availability window of the media content for the media content in the subscription on-demand right.

10. A method for use with a system including a non-transitory memory storing a subscription entitlement database and a hardware processor, the method comprising:
displaying, using the hardware processor, a user interface for a user to access a media content during a subscription on-demand availability window for the media content, according to a subscription on-demand right associated with the media content in the subscription entitlement database;
prior to an end date of the subscription on-demand availability window, displaying a notification on the user interface to notify the user of the subscription on-demand availability window for the media content, prior to the user performing any of selecting to access the media content or accessing the media content, based on the subscription on-demand right to indicate the end date of the subscription on-demand availability window;
displaying, using the hardware processor, an on-demand right extension option on the user interface for the user to extend access to the media content available based on the subscription on-demand right beyond the end date of the subscription on-demand availability window for the media content based on the subscription on-demand right;
in response to receiving, via the user interface, a selection of the option to extend access from the user, extending, using the hardware processor, access to the media content beyond the end date of the subscription on-demand availability window for the media content based on the subscription on-demand right;

receiving, via the user interface, a request from the user to stream the media content after the end date of the subscription on-demand availability window for the media content based on the subscription on-demand right; and streaming the media content to the user, in response to the request, after the end date of the subscription on-demand availability window if the user extended access to the media content.

11. The method of claim 10, wherein the extended access is one of a limited-term extended access entitlement and a permanent extended access.

12. The method of claim 11, wherein, when the extended access is the permanent extended access, the method further comprises:

storing, using the hardware processor, an extended access entitlement in a transactional entitlement database.

13. The method of claim 10, wherein providing access to the media content for the duration of the extended access includes enabling the user to download the media content to a user device.

14. The method of claim 10, wherein extending access to the media content for the duration of the extended access includes enabling the user to stream the media content for the duration of the extended access.

15. The method of claim 10, further comprising:

storing, using the hardware processor, an extended access entitlement in the subscription entitlement database;

providing, using the hardware processor, the extended access entitlement to a streaming service to enable the user to access the media content through the streaming service during an extended access period.

16. The method of claim 10, wherein the user is notified of the subscription on-demand availability window based on one of a genre of the media content, and a user rating of the media content.

17. The method of claim 10, wherein the media content is one of a video content, an audio content, a computer game, and an app.

18. The method of claim 10, wherein extending access to the media content includes adjusting the subscription on-demand availability window of the media content for the media content in the subscription on-demand right.

* * * * *